United States Patent [19]

Hoch et al.

[11] 4,323,510
[45] Apr. 6, 1982

[54] BROWN VAT DYE AND ITS PREPARATION

[75] Inventors: Helmut Hoch; Heinrich Hiller, both of Wachenheim, Fed. Rep. of Germany

[73] Assignee: BASF Aktiengesellschaft, Ludwigshafen, Fed. Rep. of Germany

[21] Appl. No.: 155,189

[22] Filed: Jun. 2, 1980

[30] Foreign Application Priority Data

Jun. 28, 1979 [DE] Fed. Rep. of Germany ....... 2926025

[51] Int. Cl.$^3$ .......................... C07C 50/18; C09B 1/00
[52] U.S. Cl. ...................................... 260/367; 546/30; 8/650
[58] Field of Search ....................... 260/367, 352, 364; 8/650; 546/30

[56] References Cited

U.S. PATENT DOCUMENTS

| | | | |
|---|---|---|---|
| 2,791,587 | 5/1957 | Basel et al. | 546/30 |
| 3,138,613 | 6/1964 | Weber et al. | 546/30 |
| 3,418,321 | 12/1968 | Gordon et al. | 546/30 |
| 3,446,810 | 5/1969 | Dien et al. | 546/30 |
| 3,741,994 | 6/1973 | Fujii et al. | 260/364 |

FOREIGN PATENT DOCUMENTS

| | | |
|---|---|---|
| 743592 | 12/1943 | Fed. Rep. of Germany . |
| 1644485 | 7/1971 | Fed. Rep. of Germany . |
| 1769603 | 3/1972 | Fed. Rep. of Germany . |
| 878647 | 6/1973 | Fed. Rep. of Germany . |
| 2450787 | 10/1976 | Fed. Rep. of Germany . |
| 45-44531 | 8/1970 | Japan . |
| 46-01575 | 6/1971 | Japan . |
| 46-35382 | 12/1971 | Japan . |
| 47-76928 | 1/1972 | Japan . |
| 771748 | 4/1957 | United Kingdom . |
| 779508 | 7/1957 | United Kingdom ................ 260/352 |
| 1213540 | 11/1970 | United Kingdom . |

OTHER PUBLICATIONS

*B.I.O.S. Final Report*, No. 987, p. 76, "German Dyestuffs and Intermediates Industry Vat Dyestuffs and Intermediates".

*Final Report*, No. 1313 II, p. 142, "German Dyestuffs and Dyestuff Intermediates, Including Manufacturing Processes Plant Design and Research Data".

*Primary Examiner*—Winston A. Douglas
*Assistant Examiner*—Raymond K. Covington
*Attorney, Agent, or Firm*—Oblon, Fisher, Spivak, McClelland & Maier

[57] ABSTRACT

A vat dye obtained by heating a condensation product, which itself has been prepared by heating 3,9-di-(1-anthraquinonylamino)-benz[d,e]anthrone in an aluminum chloride/picoline or aluminum chloride/quinoline melt in the presence of sulfuryl chloride or thionyl chloride, in a melt of an alkali metal hydroxide in an alcohol or glycol or aqueous glycol.

The dye gives deep clear brown dyeings having good fastness characteristics.

10 Claims, No Drawings

BROWN VAT DYE AND ITS PREPARATION

The present invention relates to a novel brown vat dye based on 3,9-di-(1-anthraquinonylamino)-benz[d,e]anthrone, and to a process for its preparation.

3,9-Di-(1-anthraquinonylamino)-benz[d,e]anthrone is obtained by reacting 3,9-dibromobenz[d,e]anthrone and 1-amino-anthraquinone in the molar ratio of 1:2 (BIOS Report 987, page 76; FIAT Report 1313 II, page 142; U.S. Pat. Nos. 3,138,613 and 3,238,231).

This benzanthrone derivative is a starting material for various valuable vat dyes, the structure of which is only partially known. These dyes give olive to olive brown hues on cotton.

C.I. Vat Black 25 (C.I. No. 69,525), a well-known olive dye, is obtained from 3,9-di-(1-anthraquinonylamino)-benz[d,e]anthrone by intramolecular condensation in a solution of potassium hydroxide in alcohol (BIOS Report 987, page 76; Japanese Published Application No. 72/44,531) or in a solution of potassium hydroxide in glycol (German Laid-Open Application DOS No. 1,644,485; U.S. Pat. Nos. 3,418,321 and 3,446,810).

If this olive dye is heated in a melt which contains aluminum chloride, a flux and a halogenating agent (German Pat. No. 2,450,787, German Laid-Open Application DOS No. 1,813,729 and German Pat. Nos. 743,592 and 1,039,162), valuable vay dyes are obtained, which give fast olive hues on cotton.

If 3,9-di-(1-anthraquinonylamino)-benz[d,e]anthrone, hereafter also referred to as dianthrimide, is heated at 270° C. in a sodium hydroxide/potassium hydroxide melt, vat dyes are obtained which give yellowish olive hues on cotton (German Pat. No. 1,769,603). The overall picture is that when dianthrimide is subjected to condensation under alkaline conditions it gives virtually exclusively olive dyes.

Further, the patent literature discloses that dianthrimide may be condensed in the presence of Friedel-Crafts catalysts or under acid conditions. Thus, dianthrimide, when heated at from 50° to 200° C. in a melt containing aluminum chloride, urea and pyridine or picoline, in the presence of a chlorinating agent, gives reddish brown vat dyes (German Laid-Open Application DOS No. 2,018,362). Similar reactions are described in Japanese Laid-Open Application No. 72/35,382 and in Japanese Published Application No. 75/001,575.

Japanese Laid-Open Application No. 73/76,928 discloses that dianthrimide, treated with aluminum chloride and phosphorus pentachloride, in the presence or absence of N-containing heterocyclic compounds, gives brown vat dyes.

Though brown vat dyes based on this relatively cheap method of synthesis should have good market prospects, none of the dyes obtainable from dianthrimide by acid condensation in the presence of halogenating agents is as yet available on the market. Investigation of the dyes obtainable by acid condensation of dianthrimide in accordance with German Laid-Open Application DOS No. 2,018,362 or Japanese Laid-Open Application No. 73/76,928 has shown that the dyeings obtained with these products have good washfastness and soda-boiling fastness, only just sufficient fastness to hypochlorite bleach, but only moderate lightfastness. However, in the Fade-O-meter test the lightfastness of these dyes is found to be about 3 ratings below those of commercial reddish brown and brown dyes, and hence below the prior art. These shortcomings are serious disadvantages of the dyes obtainable from dianthrimide by acid condensation, and explain why such dyes are not marketed.

It is an object of the present invention to produce vat dyes of high tinctorial value from the non-lightfast brown vat dye obtainable by heating 3,9-di-(1-anthraquinonylamino)-benz[d,e]anthrone in an acid melt.

We have found that this object is achieved and that vat dyes of high tinctorial value are obtained if the condensation product which is obtained by heating 3,9-di-(1-anthraquinonylamino)-benz[d,e]anthrone in a melt of aluminum chloride and picoline, quinoline or mixtures thereof, in the presence of sulfuryl chloride or thionyl chloride, at 110°–140° C. is isolated and then heated at from 100° to 180° C. in a melt of an alkali metal hydroxide in an alcohol or glycol or aqueous glycol.

The new vat dye has a very high tinctorial strength and gives dyeings having a clear brown (not reddish brown) hue. The dyeings are distinguished by good washfastness and fastness to soda boiling, good fastness to ironing and to water spotting, good fastness to washing in liquors containing peroxide, satisfactory fastness to hypochlorite bleaching, and good lightfastness.

The novel dye differs clearly from the starting material (ie. the condensation product or intermediate) in its hue and in the fastness of the dyeings which it produces. Thus, for the same depth of color, the lightfastness of the dyeings obtained with the novel dye is some 2 to 2.5 ratings better than in the case of the intermediate. This result was unexpected.

The novel vat dye may be prepared by introducing the starting material (i.e. the intermediate) into a melt of an alkali metal hydroxide in an alcohol or glycol and heating the mixture at from 100° to 180° C. Suitable alcohols to use in the melts are $C_1$–$C_4$-alkanols, eg. methanol, ethanol and the butanols, and suitable glycols are the glycols and glycol monoethers mentioned below. Specific examples of suitable melts are potassium hydroxide in methanol or ethanol, and potassium hydroxide in isobutanol in the presence of sodium acetate, as described, for example, in BIOS Report 987, page 76, U.S. Pat. No. 3,238,231 and Japanese Published Application No. 72/44,531.

Preferably, the reaction of the starting material (ie. of the condensation product) is carried out in a melt of an alkali metal hydroxide in an aqueous glycol. The method used is to introduce the milled starting material into a melt of an alkali metal hydroxide, or of a concentrated aqueous solution of an alkali metal hydroxide, and a glycol or glycol monoether, with or without sodium acetate. Per part by weight of starting material, from 1 to 5 parts by weight of alkali metal hydroxide, preferably sodium hydroxide or potassium hydroxide, from 0.5 to 3 parts by weight of glycols or partially etherified glycols and, where relevant, up to 0.3, preferably from 0.1 to 0.3, part by weight of sodium acetate are required. The melt is then heated at from 100° to 180° C., preferably from 120° To 150° C. The reaction is complete after from 2 to 6 hours.

Suitable glycol constituents to use in the melt of alkali metal hydroxide in an aqueous glycol are glycols and partially etherified glycols, eg. ethylene glycol, diethylene glycol, triethylene glycol, polyethylene glycols, propylene glycols, dipropylene glycols, tripropylene glycols, polypropylene glycols and the mono-$C_1$-$C_4$-alkyl ethers of these compounds, eg. diethylene glycol monomethyl ether, diethylene glycol monopropyl ether, diethylene glycol monobutyl ether and mixtures of these.

After completion of the reaction, the melt is introduced into water and any portion of the dye present in the reduced form is oxidized with an oxidizing agent, eg. air, hydrogen peroxide or a salt of nitrobenzenesulfonic acid, at from 60° to 80° C.

The vat dye is isolated from the aqueous suspension in a conventional manner, for example by filtering, and washing neutral. The vat dye obtained contains from about 0.1 to 3% by weight of chlorine and from 1 to 5% by weight of sulfur bonded to organic structures. The dye may be processed, either as the filter cake or after drying, to convert it to the form required for use.

The intermediate (starting material) required for the new vat dye is prepared from 3,9-di-(1-anthraquinonylamino)-benz[d,e]anthrone (=dianthrimide) in a melt of aluminum chloride and picoline and/or quinoline in the presence of a chlorinating agent, by the process described in German Laid-Open Application DOS No. 2,018,362. To keep the melt more fluid, formates or formamides (German Pat. No. 878,647 and German Laid-Open Application DOS No. 2,450,787) or urea may be added.

Advantageously, from 5 to 10 parts by weight of anhydrous aluminum chloride and from 0.5 to 3 parts by weight of picoline and/or quinoline, or a mixture of from 0.1 to 2 parts by weight of urea and from 1 to 2 parts by weight of picoline and/or quinoline, is used in the melt, per part by weight of dianthrimide. Furthermore, from 0.1 to 0.3 part by weight of sulfuryl chloride or thionyl chloride is added to the melt. The melt is at from 100° to 140° C. After completion of the reaction, which is in general the case after from 1 to 5 hours, the melt is worked up in a conventional manner. An advantageous method is to decompose the melt by introducing it into aqueous hydrochloric acid, filter the resulting suspension, wash the filter residue neutral with water and dry it. The product thus obtained is then milled, after which it is suitable for conversion to the novel dye.

Depending on the nitrogen base used in the aluminum chloride melt, the vat dyes obtained from the condensation product by the process according to the invention give neutral to strongly yellowish brown dyeings.

For example, the starting material obtained from an aluminum chloride/picoline melt gives vat dyes which produce neutral brown hues. On the other hand, the condensation product obtained from an aluminum chloride/quinoline melt gives vat dyes which produce strongly yellowish brown hues. The hues of the latter are very close to that of Vat Brown 46; C.I. No. 70,905. However, the dye of the present invention is markedly superior to this prior art dye in its brilliance and tinctorial strength.

The Examples which follow additionally illustrate the invention. Parts and percentages are by weight.

EXAMPLE 1

(a) Starting material: 50 parts of urea and 100 parts of 3-picoline are added to 750 parts of anhydrous aluminum chloride in such a way that the temperature does not exceed 140° C. 15 parts of sulfuryl chloride are then added over 15 minutes to the mobile melt at 110° C., after which the mixture is stirred for 30 minutes at 120° C. 45 parts of milled 3,9-di-(1-anthraquinonylamino)-benz[d,e]anthrone are then introduced over 1 hour at 120° C., after which the mixture is stirred for 2 hours at 120°–125° C. The melt is introduced into 5,000 parts of ice water and 50 parts of 30% strength hydrochloric acid and stirred for 1 hour. The dye intermediate is then filtered off, washed neutral with warm water, dried at 100° C. and then milled. 49 parts of a brown product are obtained.

(b) 49 parts of the product obtained as described in (a) are introduced, over 20 minutes, into a mixture of 140 parts of 50% strength aqueous sodium hydroxide solution, 90 parts of diethylene glycol monomethyl ether, 10 parts of sodium acetate and 70 parts of water. The mixture is then heated to 130° C. and stirred for 4 hours at this temperature. Thereafter the melt obtained is introduced into 5,000 parts of water in which 25 parts of sodium m-nitrobenzenesulfonate have been dissolved. The suspension is stirred for 2 hours at 80° C. and filtered, and the filter residue is washed neutral and dried. Yield: 49 parts of a brown vat dye, which dyes cotton in neutral brown hues. The dyeings are very fast and deeply colored.

EXAMPLE 2

(a) Starting material: 150 parts of 3-picoline are added, at 130° C., to 750 parts of anhydrous aluminum chloride, and 15 parts of sulfuryl chloride are then added dropwise. The mixture is next heated at 140° C. for 30 minutes, and then cooled to 120° C. At this temperature, 45 parts of milled 3,9-di-(1-anthraquinonylamino)-benz[d,e]anthrone are introduced over 45 minutes, and the mixture is stirred for 1 hour at 125°–130° C. The melt is introduced into 10,000 parts of water and 100 parts of 30% strength hydrochloric acid and the suspension is stirred for 1 hour. The dye intermediate is then filtered off, washed neutral with warm water, dried at 100° C. and milled. Yield: 49 parts of starting material, in the form of a brown powder.

(b) Dye: 49 parts of the powder obtained as described in (a) are introduced into a mixture of 140 parts of 50% strength aqueous sodium hydroxide solution, 90 parts of polyethylene glycol of molecular weight 200, 10 parts of sodium acetate and 60 parts of water. The suspension is heated to 130° C. and stirred for 5 hours at this temperature. The melt is then introduced into 5,000 parts of water in which 25 parts of sodium m-nitrobenzenesulfonate have been dissolved. The suspension is stirred for 2 hours at 80° C. and then filtered. The filter residue is washed neutral and dried. Yield: 49 parts of a brown vat dye, which dyes cotton in neutral brown hues. The dyeings are very fast and deeply colored.

EXAMPLE 3

(a) Starting material: 150 parts of quinoline are added to 750 parts of anhydrous aluminum chloride in such a way that the temperature does not exceed 140 C. 15 parts of sulfuryl chloride are then added over 15 minutes to the mobile melt at 110° C., after which the mixture is stirred for 30 minutes at 140° C. 75 parts of milled 3,9-di-(1-anthraquinonylamino)-benz[d,e]anthrone are then introduced over 1 hour at 120° C., after which the mixture is stirred for 2 hours at 120°–125° C. The melt is introduced into 5,000 parts of ice water and 50 parts of 30% strength hydrochloric acid and stirred for 1 hour. The dye intermediate is then filtered off, washed neutral with warm water and dried at 100° C. and milled. 78 parts of a brown product are obtained.

(b) 49 parts of the product obtained as described in (a) are introduced, over 20 minutes, into a mixture of 210 parts of 50% strength aqueous sodium hydroxide solution, 90 parts of diethylene glycol monomethyl ether and 10 parts of sodium acetate. The mixture is then heated to 140° C. and stirred for 5 hours at this temperature. Thereafter the melt obtained is introduced into 5,000 parts of water in which 25 parts of sodium m-nitrobenzenesulfonate have been dissolved. The suspension is stirred for 2 hours at 80° C. and filtered, and the filter residue is washed neutral and dried. Yield: 48 parts of a brown vat dye, which dyes cotton in brown hues which are substantially more yellowish than in the case of the dyes obtained as described in Examples 1 and 2. The dyeings are very fast and deeply colored.

We claim:

1. A vat dye obtained by heating a condensation product itself obtained by heating 3,9-di-(1-anthraquinonylamino)-benz[d,e]anthrone in a melt of aluminum chloride and picoline or quinoline or a mixture of these in the presence of sulfuryl chloride or thionyl chloride at from 110° to 140° C. - at from 100° to 180° C. in a melt of an alkali metal hydroxide in an alcohol or a glycol or an aqueous glycol.

2. A process for the preparation of a novel vat dye, wherein the condensation product obtained by heating 3,9-di-(1-anthraquinonylamino)-benz[d,e]anthrone in a melt of aluminum chloride and picoline or quinoline or a mixture of these in the presence of sulfuryl chloride or thionyl chloride at from 110° to 140° C. is heated at from 100° to 180° C. in a melt of an alkali metal hydroxide in an alcohol or a glycol or an aqueous glycol.

3. A process as claimed in claim 2, wherein a melt of an alkali metal hydroxide in a $C_1$-$C_4$-alkanol, a glycol or a partially etherified glycol is used.

4. A process as claimed in claim 2, wherein a melt of an alkali metal hydroxide in an aqueous glycol is used.

5. A process as claimed in claim 3 or 4, wherein the glycol or partially etherified glycol used is ethylene glycol, diethylene glycol, triethylene glycol, polyethylene glycol, propylene glycol, dipropylene glycol, tripropylene glycol, polypropylene glycol, a mono-$C_1$-$C_4$-alkyl ether of one of these glycols, or a mixture of the above.

6. A process as claimed in claim 4, wherein the melt is heated at from 120° to 150° C.

7. A process as claimed in claim 5, wherein the melt is heated at from 120° to 150° C.

8. A process as claimed in claim 4, wherein the melt contains from 1 to 5 parts by weight of alkali metal hydroxide and from 0.5 to 3 parts by weight of glycols or partially etherified glycols, with or without from 0.1 to 0.3 part by weight of sodium acetate, per part by weight of starting material.

9. A process as claimed in claim 5, wherein the melt contains from 1 to 5 parts by weight of alkali metal hydroxide and from 0.5 to 3 parts by weight of glycols or partially etherified glycols, with or without from 0.1 to 0.3 part by weight of sodium acetate, per part by weight of starting material.

10. A process as claimed in claim 7, wherein the melt contains from 1 to 5 parts by weight of alkali metal hydroxide and from 0.5 to 3 parts by weight of glycols or partially etherified glycols, with or without from 0.1 to 0.3 part by weight of sodium acetate, per part by weight of starting material.

* * * * *